United States Patent
Reason et al.

[15] 3,653,713
[45] Apr. 4, 1972

[54] SEATING STRUCTURE

[72] Inventors: Dennis Joseph Reason; Leslie James Green, both of Ampthill, England

[73] Assignee: Hunting Engineering Limited

[22] Filed: July 23, 1970

[21] Appl. No.: 57,496

[52] U.S. Cl..............................297/232, 297/243, 297/163
[51] Int. Cl............................................................B60n 1/00
[58] Field of Search..................297/232, 355, 359, 360, 361, 297/257, 243, 216; 248/188.1, 188.91, 429, 430, 424

[56] References Cited

UNITED STATES PATENTS

| | | | |
|---|---|---|---|
| 2,933,127 | 4/1960 | Brewster | 297/216 |
| 2,971,566 | 2/1961 | Negroni | 297/216 X |
| 3,316,013 | 4/1967 | Abel et al. | 297/232 X |
| 2,783,821 | 3/1957 | Sherman | 297/375 |
| 3,037,812 | 6/1962 | Monroe | 297/355 |
| 2,959,207 | 11/1960 | Brewster | 297/216 |
| 3,075,736 | 1/1963 | Freedman | 248/430 X |
| 3,145,051 | 8/1964 | Rausch | 297/216 |
| 3,329,463 | 7/1967 | Zimmerman | 297/243 |
| 2,139,071 | 12/1938 | Eichel | 248/424 X |

*Primary Examiner*—Francis K. Zugel
*Attorney*—Holcombe, Wetherill & Brisebois

[57] ABSTRACT

A seating structure comprises a wrap around cross bar at seat level supported on pillars which are secured to a floor-level cross-beam fixed to rails on the floor of an aircraft. Side struts extend diagonally upwards connecting the sides of the cross bar with the rear ends of the wrap-around beam. A rear leg secured to the rails by a foot is connected to a rigid bifurcated lever at seat level, the lever being secured to the wrap-around beam. The spaces on either side of the leg such as might be caused by vertical rear side legs. In use, the upholstery is supported on webbing above the structure and back rests and arms are provided. The structure is designed to with stand loads in all three dimensions with minimum weight and minimum obstruction to the feet of passengers seated behind.

6 Claims, 6 Drawing Figures

SEATING STRUCTURE

This invention relates to a seating structure. The invention is particularly concerned with a seating structure for an aircraft, and is described herein as applied to an aircraft. However, the invention is also applicable to seating structures for other vehicles, such as land vehicles, water vehicles and air cushion vehicles, where passengers are seated both side by side and one behind the other.

In an aircraft, passengers are often seated in multiple seats (that is to say a structure having two or sometimes more seats side by side) which are disposed in rows extending fore and aft of the aircraft. Space is limited, and space is provided under the seats as leg room, and often also to accommodate hand luggage. The weight of the structure must be minimised. The structure must not only withstand the weight of a passenger, but also must absorb horizontal and vertical loads, and combinations thereof, in the event of an emergency landing or crash. These considerations conflict, and cause particular problems in design.

The seating structure could include side legs capable of attachment to the floor and extending generally vertically upwards, with the seats projecting at least partly forward of the legs, but the fixing positions on the floor (usually rails extending fore and aft) are not usually in the optimum positions from the points of view either of strength of the seating structure or convenience to the passengers.

The seating structure could consist of a cantilever structure with legs fixed to a cross member at the forward edge of the structure and the seat projecting backwards from the legs. This might improve leg room, but at the expense of weight, or strength of the structure.

The present invention provides a seating structure for multiple seats in a vehicle, comprising a cross member at or adjacent the front of the seating structure, two side arms rigidly secured to and extending rearwards from said cross member at or adjacent the sides of the seating structure, at least one load bearing member connected to said cross member and extending generally beneath said cross member, a fixing member for fixing to a floor in the vehicle extending crosswise of the seating structure rearwards of said load bearing member, and connecting means for connecting said fixing member to said cross member and including a connecting member extending upwards from said fixing member intermediate the sides of the seating structure, so that spaces opening out to the sides of the seating structure on each side of said connecting member are free from obstruction caused by members projecting substantial heights from points at floor level rearward of said load bearing member.

The terms "front" and "rear" are used herein with reference to the direction a passenger faces when seated normally in one of the seats.

The preferred embodiment is a structure designed so that the seated passenger faces forward, but the invention comprehends an aft-facing seat, at least in its broader aspects.

The preferred embodiment has back and arm rests fixed to it, and will normally be upholstered, in use.

Other features and advantages of the invention will appear from the following description of an embodiment thereof, given by way of example, with reference to the accompanying drawings, in which.

Figure 1:
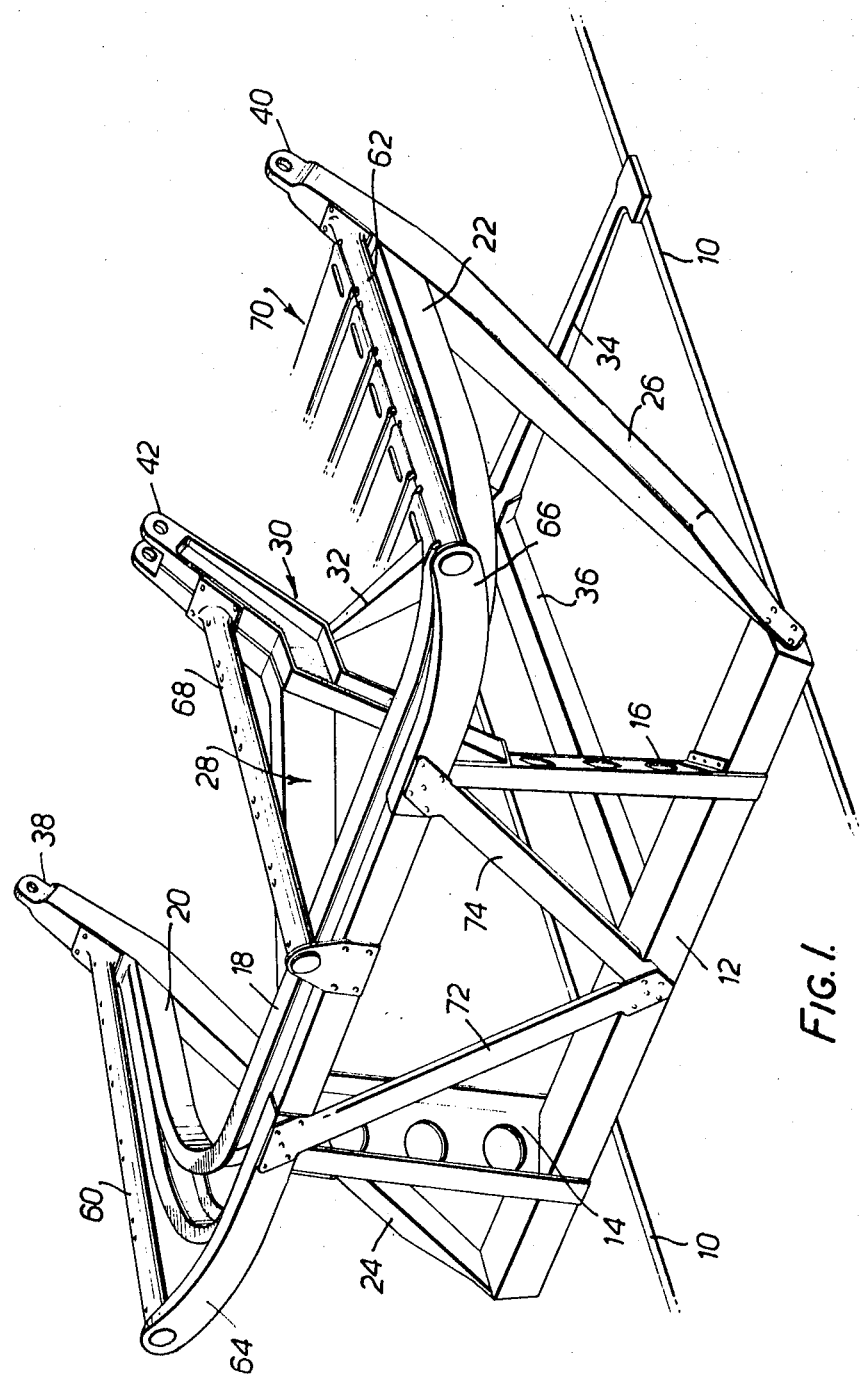
FIGS. 1 and 2 are diagrammatic perspective views of part of the skeleton structure of a double seat for an aircraft, in accordance with the invention.
Figure 2:
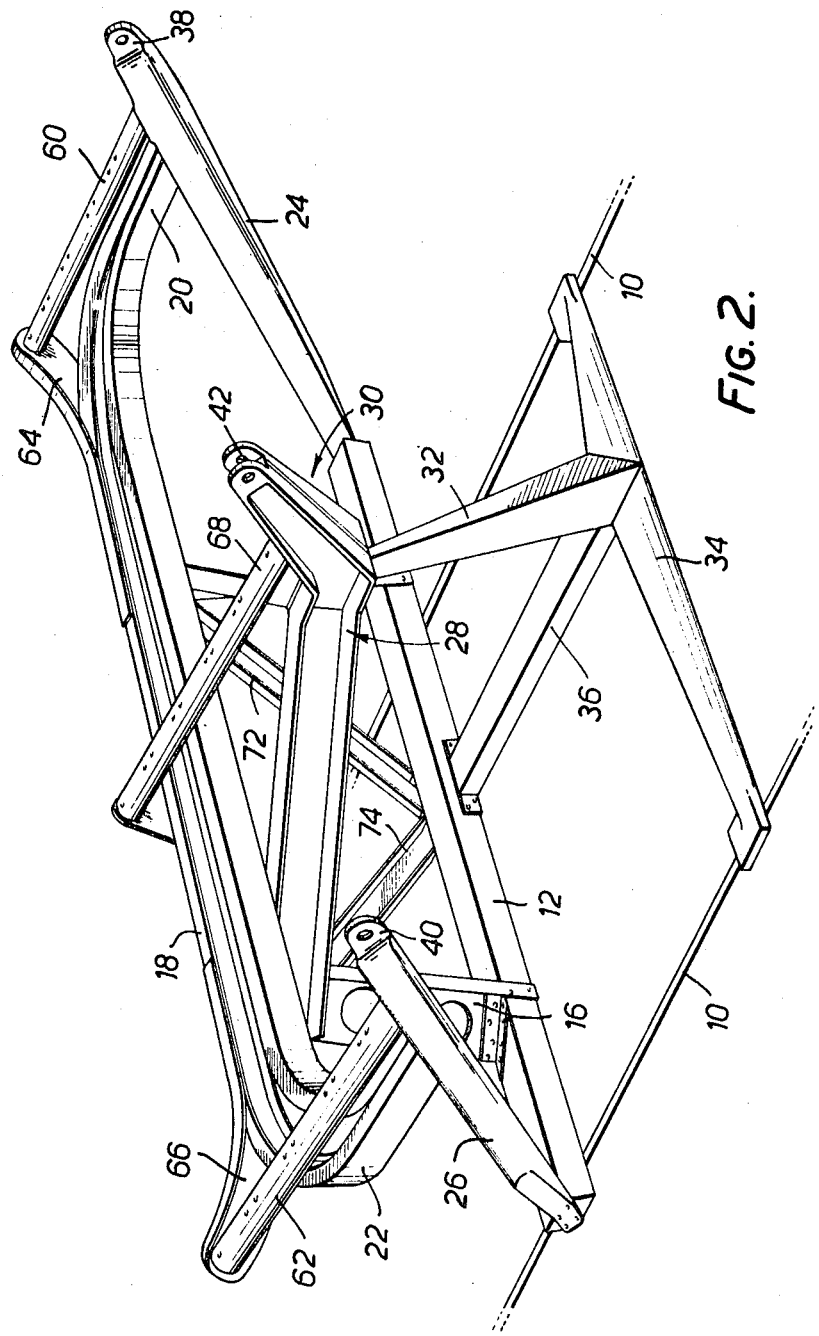

Referring first to FIG. 1, the seat structure is to be fixed to rails 10 on the floor of an aircraft. The exact position of such rails in aircraft is not standardised, and by way of example it is assumed that the positions of the rails require the seat structure to be positioned asymmetrically over the rails.

The structure comprises a front cross beam 12 which can be fixed to the rails 10 by fittings (not shown) which permit some adjustment of the position of the bar sideways of the rails, but which can be locked to resist upwards and sideways loading. The beam 12 is stiff against bending moments.

Pillars 14 and 16 extend generally vertically upwards from, and are rigidly secured at their lower ends to the beam 12. The pillars are flanged to give increased stiffness, and apertured to reduce weight. The other end of the pillars 14 and 16 are connected to an upper cross-bar 18, which is bent to provide side arms 20 and 22 projecting rearwardly from the cross-bar 18. The cross-bar 18 and side arms 20 and 22 are formed from a channel section member. Struts 24 and 26 are secured at respective ends of a fixing member in the form of a cross-bar 12, and extend upwards and rearwards, being secured to the free ends of the side arms 20 and 22 adjacent the upper ends of the struts.

A bifurcated lever 28 has its two limbs secured respectively to the pillars 14 and 16, and hence to the cross-bar 18, and extends rearwardly with the junction 30 between the two limbs disposed centrally at the rear of the structure. A rigid central leg 32 connects the junction 30 to a fixing member in the form of a foot 34, the leg 32 extending upwardly and forwardly from, and being rigidly secured to, the foot 34. The foot 34 comprises a cross-bar of minimal height consistent with its required strength, and chamfered so as to present a minimum obstruction to the feet of a passenger behind. In this embodiment, the length of the foot 34 on each side of the leg 32 is just sufficient to reach the rails 10, but obviously the foot could be of greater length to accommodate different rail positions. The foot 34 is attached to the rails 10 by fittings which resist upwards, forwards and sideways loading. A tie 36 connects the foot 34 with the cross-bar 12.

Bars 60 and 62 have their rear ends mounted on the struts 24 and 26, and their front ends connected to the cross-bar 18 by lugs 64 and 66. A central bar 68 is connected between the junction 30 and the cross-bar 18. The bars 60, 62 and 68 extend fore and aft, above the level of the cross-bar 18 and side-arms 20 and 22, and in the complete seat, support webbing, indicated schematically at 70, which extends cross-wise of the seat.

Ties 72 and 74 are connected diagonally across the structure between the cross-bar 12 and the cross-bar 18, to brace the structure against sideways loads.

Figure 3:
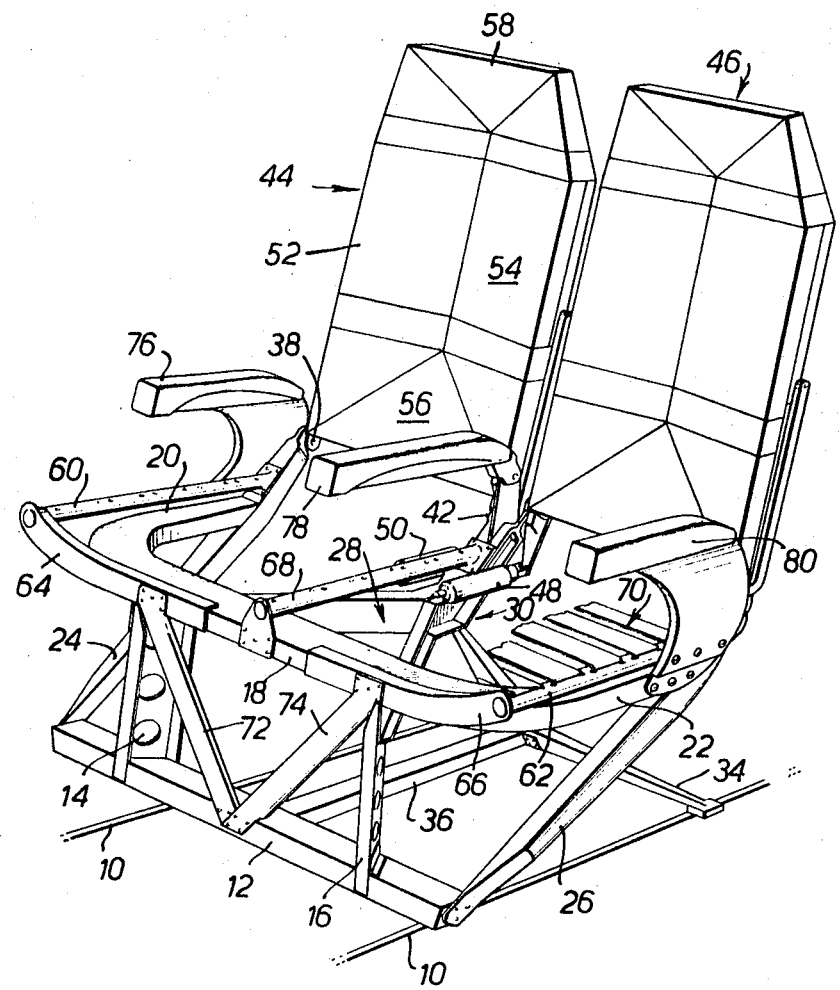
FIGS. 3 and 4 are diagrammatic perspective views of the skeleton structure with back and arm rests attached.
Figure 4:
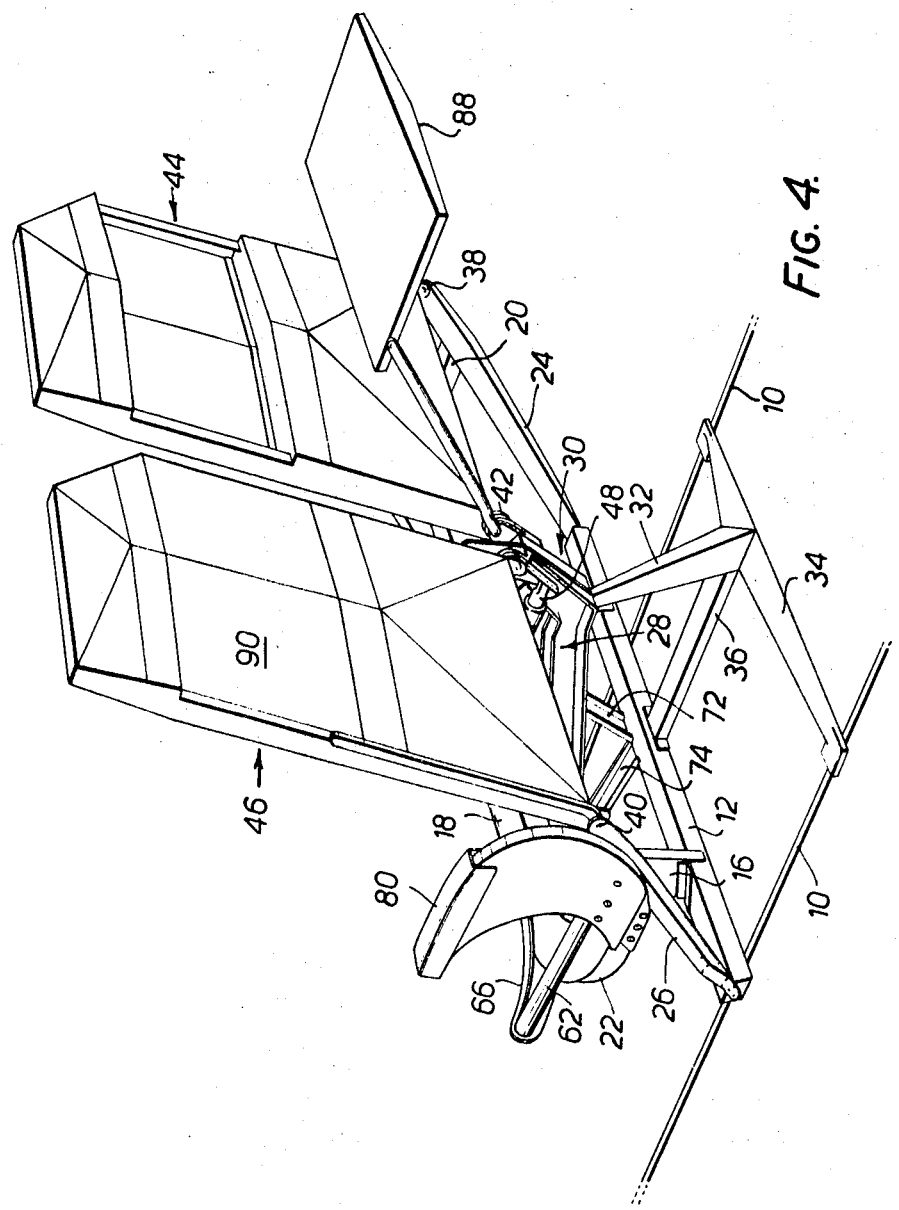

Preferably, as shown in FIGS. 3 and 4, arm rests 76, 78 and 80 are connected at the sides of the structure, and in the centre of the structure between the two seats. The side arm rests 76 and 80 are attached to the bars 60 and 62 and to the side arms 20 and 22. The central arm rest 78 is connected to the junction 30.

Hinge points 38, 40 and 42 are provided integrally with the upper ends of the struts 24 and 26, and with the junction 30 respectively. Back rests 44 and 46 are mounted on the hinge points 38, 40 and 42, in use, as shown in FIGS. 3 and 4. Seat belt attachments (not shown) can also be secured to the structure by the hinge points 38, 40 and 42. The usual hydraulic latches 48 and 50 may be provided to control the positions of the back rests. Preferably, and as shown, each of the back rests 44 and 46 comprises a panel which is shaped to present a concave surface to the back of the passenger, and has two major flat faces 52 and 54 intersected along a line disposed in a vertical plane, and two minor flat faces 56 and 58 extending perpendicular to the vertical plane, and at an angle to the intersection line of the faces 52 and 54.

Figure 5:
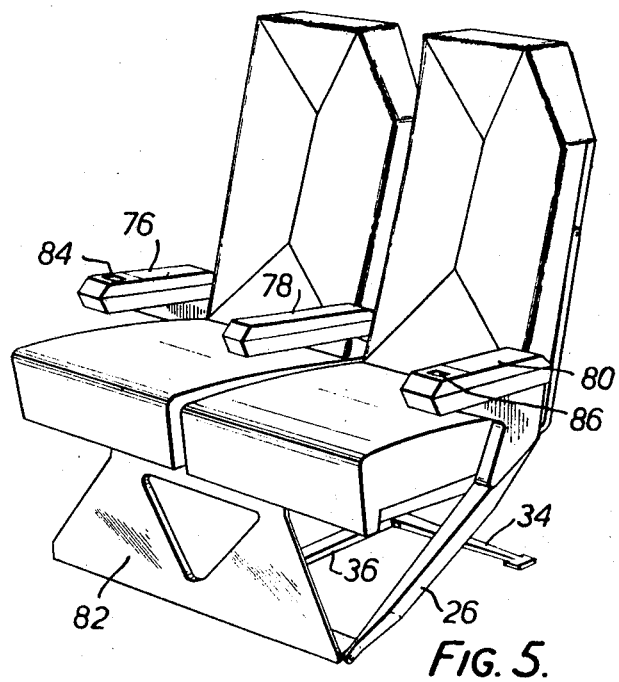
FIGS. 5 and 6 are diagrammatic perspective views of the complete double seat.
Figure 6:
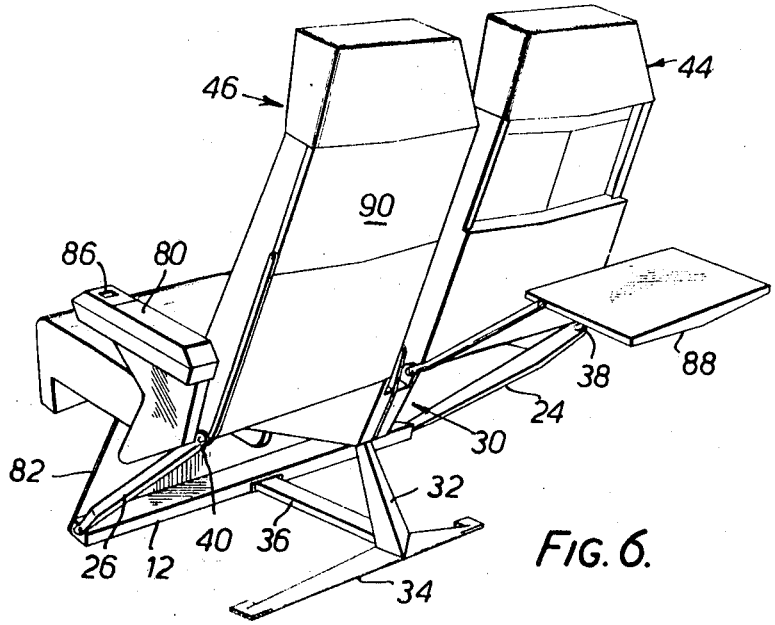

One possible arrangement of the complete seat is indicated diagrammatically in FIGS. 5 and 6, purely by way of example. It will be seen that padded upholstery has been provided on the webbing 70, and the back rests 44 and 46. A decorative panel 82 conceals the skeleton structure at the front of the seat. The usual passenger amenities are provided, including ash trays 84 and 86, recline controls (not shown), and folding tables 88 and 90.

The skeleton structure of the seat has been carefully designed to take account of the various loads which might be encountered by the seat. The loads fall into three main categories, firstly, vertical loads caused by one or more passengers sitting on the structure both in normal use, and in the event of a crash or emergency landing, secondly horizontal fore and aft loads such as would be caused by sharp deceleration of the aircraft on emergency landing or crashing, and thirdly sideways loads, again such as might be produced during a crash or emergency landing, of the aircraft.

Vertical loads are borne principally by the pillars 14 and 16 and leg 32. The vertical load on the bars 60 and 62 is taken at their rearward ends by the struts 24 and 26, which are prevented from pivoting relative to the cross-bar 12 by the side arms 20 and 22. Vertical loads on the central bar 68 are borne at its rearward end by the lever 28, partly by cantilever action from the pillars 14 and 16, but mainly by the leg 32 acting as a strut.

The structure is anchored against forward loading by the foot 34. Accordingly, during forward loading of the structure, the upper parts of the structure tend to move forward over the bar 12 and foot 34. The leg 32, acting as a tie now, restrains rotation of the lever 28, so as to prevent twisting of the structure about the bar 12. The tie 36 prevents forward movement of the bar 12 relative to the foot 34. Rotation of the side arms 20 and 22 relative to the pillars 14 and 16 is prevented by the struts 24 and 26 which co-operate with the side arms 20 and 22 to bear a part of the forward load.

The ties 72 and 74 brace the pillars 14 and 16 against sideways loading, and the bifurcated form of the lever 28 ensures that this lever can also bear sideways load.

One important feature of the structure is that spaces give out to the side of the structure on each side of the leg 32, and these spaces are free from obstruction caused by members projecting substantial heights from points at floor level rearward of the pillars 14 and 16. The foot 34 is in these spaces, but has a minimal height above floor level so that it does not present a significant obstruction to the foot of a passenger behind. The struts 24 and 26 limit the free space but are disposed at the side of the structure, and project from points at floor level beside the members 14 and 16, and not rearward of them. Accordingly, not only is ample leg room provided for a passenger seated behind, but also his movement into and out of his seat is facilitated. In this connection, if legs projected generally vertically upwards from the rails 10, other than at the front of the seat, the leg room of the passenger might be reduced (depending upon the positions of the rails 10) but in any case his movement into and out of his seat would be obstructed.

Moreover, these spaces provide ample room for hand luggage. It will be noted that the pillars 14 and 16 and ties 72 and 74 provide restraint against the hand luggage being thrown forward in the event of a crash, and such restraint is improved if decorative panels such as 82 are added.

It will be seen that the structure includes a frame at the front (formed principally by the pillars 14 and 16, the cross bar 18 and cross beam 12) which is rigid against sideways shear loads, and against vertical loads, the bottom of the frame being fixed against forward loads (by the foot 34 and tie 36) and which is prevented from rotation on forward loading, and from twisting on sideways loading or asymmetric forward loading, by the rearwardly extending lever 28 connected to the floor (by leg 32) and foot 34.

It will be appreciated that many modifications to and variations of the preferred embodiment shown are possible. For example, the structure shown is for a forward facing seat. It is possible to adapt the structure to an aft facing seat, although it will be appreciated that different loads will have to be borne. Also, the seat shown is a double seat; the principles of the invention are applicable to a triple seat, and in this case it may prove expedient to provide two legs such as 32 intermediate the sides of the seating structure, rather than a single one as for the double seat. Moreover more than one tie such as 36 may be provided between the anchorages.

The seating structure can obviously be adapted for use in vehicles other than aircraft. It may be that a simplified structure will suffice for such other vehicles, where design restrictions are not usually so stringent. The cost of the seat could then be somewhat reduced.

The leg room on either side of the leg 32 is particularly attractive for vehicles where passengers are seated one behind the other, especially since the only hard member extending transversely of the seating structure behind the front edge of the seat below the level of the back rest is the lever 28, whose two limbs extend diagonally across the structure from outer points at the front to a central point at the junction 30 at the rear of the structure, so as to minimise the risk of a passenger behind hurting his knees.

We claim:

1. A seating structure for multiple seats in a vehicle, comprising a wrap-around front member having a central portion extending cross-wise of and in the vicinity of the front of the seating structure and integral with two side arms extending rearwards from said central portion in the vicinity of the sides of the seating structure; load bearing means connected to and directly supporting said central portion of said front member and extending generally beneath said front member; a fixing member for fixing said structure to a floor in the vehicle, said fixing member extending cross-wise of the seating structure rearwards of said load bearing means; connecting means positioned between said fixing member and said central portion of said front member, said connecting means including a lever connected rigidly to said load bearing means in the vicinity of said central portion of said front member and projecting rearwardly therefrom and a connecting member for connecting said fixing member to the rear end of said lever and extending upwards from said fixing member intermediate the sides of the seating structure, so that spaces opening out to the sides of the seating structure on each side of said connecting member are free from obstruction caused by members projecting substantially upward from points at floor level rearward of said load bearing means; a further fixing member for fixing said structure to the floor, said further fixing member extending cross-wise of the structure and being joined to said load bearing member, and struts connecting said further fixing member to rearward portions of said side arms.

2. A seating structure as claimed in claim 1 and including at least one tie connecting said fixing members.

3. A seating structure as claimed in claim 1 wherein the upper ends of said struts have formations suitable for connection to back rest members, and to seat belt anchorages.

4. A seating structure as claimed in claim 1 and including a formation for connection to a back rest member adjacent the upper end of said connection member.

5. A seating structure as claimed in claim 1 wherein said lever comprises a bifurcated member connected to spaced points on said front member.

6. A seating structure as claimed in claim 1 and including members extending diagonally across the structure generally beneath said front member for bracing said load bearing member against sideways load on the structure.

* * * * *